(12) United States Patent
Kim

(10) Patent No.: US 9,098,151 B2
(45) Date of Patent: Aug. 4, 2015

(54) INPUT DEVICE

(75) Inventor: Do Young Kim, Gyeonggi-do (KR)

(73) Assignee: LG INNOTEK CO., LTD., Seoul (KR)

( * ) Notice: Subject to any disclaimer, the term of this patent is extended or adjusted under 35 U.S.C. 154(b) by 159 days.

(21) Appl. No.: 13/145,264

(22) PCT Filed: Jan. 18, 2010

(86) PCT No.: PCT/KR2010/000293
§ 371 (c)(1),
(2), (4) Date: Oct. 3, 2011

(87) PCT Pub. No.: WO2010/082795
PCT Pub. Date: Jul. 22, 2010

(65) Prior Publication Data
US 2012/0032914 A1 Feb. 9, 2012

(30) Foreign Application Priority Data
Jan. 19, 2009 (KR) .................. 10-2009-0004318

(51) Int. Cl.
*G06F 3/041* (2006.01)
*G06F 3/044* (2006.01)

(52) U.S. Cl.
CPC ..................... *G06F 3/044* (2013.01)

(58) Field of Classification Search
None
See application file for complete search history.

(56) References Cited

U.S. PATENT DOCUMENTS

| | | | |
|---|---|---|---|
| 6,070,463 A | 6/2000 | Moriya et al. | |
| 6,297,811 B1 * | 10/2001 | Kent et al. | 345/173 |
| 6,825,833 B2 * | 11/2004 | Mulligan et al. | 345/174 |
| 2005/0270039 A1 | 12/2005 | Mackey | |
| 2007/0062739 A1 | 3/2007 | Philipp et al. | |
| 2007/0247443 A1 | 10/2007 | Philipp | |
| 2007/0257894 A1 | 11/2007 | Philipp | |
| 2007/0279395 A1 * | 12/2007 | Philipp et al. | 345/173 |
| 2008/0246496 A1 | 10/2008 | Hristov et al. | |
| 2008/0279395 A1 | 11/2008 | Hersbach et al. | |
| 2008/0308323 A1 | 12/2008 | Huang et al. | |
| 2012/0098784 A1 | 4/2012 | Kim | |

FOREIGN PATENT DOCUMENTS

| | | |
|---|---|---|
| GB | 2439614 A | 1/2008 |
| JP | 2007/323650 A | 12/2007 |
| JP | 2007-293865 A | 11/2008 |
| KR | 10-2001-0003503 A | 1/2001 |
| KR | 10-2002-0043144 A | 6/2002 |
| KR | 10-2007-0006609 A | 1/2007 |
| KR | 10-2007-0115744 A | 12/2007 |

(Continued)

OTHER PUBLICATIONS

Office Action dated Jan. 31, 2013 in Japanese Application No. 2011-546216, filed Jan. 18, 2010.

(Continued)

*Primary Examiner* — Seokyun Moon
(74) *Attorney, Agent, or Firm* — Saliwanchik, Lloyd & Eisenschenk

(57) ABSTRACT

According to one embodiment of the present invention, an input device comprises: a first main electrode extending in a first direction; and a plurality of first branching electrodes which extend in a second direction from the first main electrode, and which have mutually different surface areas depending on their position; and the surface areas of the first branching electrodes either progressively broaden or decrease in the first direction.

6 Claims, 2 Drawing Sheets

(56) References Cited

FOREIGN PATENT DOCUMENTS

| KR | 10-2008-0081411 A | 9/2008 |
|----|-------------------|--------|
| KR | 10-2008-0110158 A | 12/2008 |
| KR | 10-2009-0011244 A | 2/2009 |
| TW | 200849073 A | 12/2008 |
| WO | WO-2004/013833 A2 | 2/2004 |

OTHER PUBLICATIONS

Supplementary European Search Report dated Jun. 26, 2013 in European Application No. 10731410.6, filed Jan. 18, 2010.
Office Action dated Aug. 26, 2013 in Chinese Application No. 201080004891.8, filed Jan. 18, 2010.
Supplementaty European Search Report dated Jun. 28, 2013 in European Application No. 10733623.2, filed Jan. 18, 2010.

\* cited by examiner

INPUT DEVICE

CROSS-REFERENCE TO RELATED APPLICATIONS

This application is the U.S. national stage application of International Patent Application No. PCT/KR2010/000293, filed Jan. 18, 2010, which claims priority to Korean Application No. 10-2009-0004318, filed Jan. 19, 2009, the disclosures of each of which are incorporated herein by reference in their entirety.

TECHNICAL FIELD

The teachings in accordance with the exemplary embodiments of this invention relate generally to an input device.

BACKGROUND ART

Concomitant with development and popularization of graphic user interface (GUI), use of an easy-input touch screen now becomes popularized. A touch screen or touch panel is a display which can detect a location of a touch within a display area, usually performed either with a human hand or a stylus. This allows the display to be used as an input device, removing a keyboard and/or a mouse as a primary input device for interacting with a display's content.

Technically speaking, the commonly used touch screens employ resistive, capacitive, ultrasonic wave, electromagnetic, vector force and optical (Infrared) touch modes. Among these types of touch screens, resistive type is the most common one, which has approximately 60% of market share (the second is capacitive type with around 24% of market share). Each of these types of touch screens has its own features, advantages and disadvantages. Now, these touch screens are briefly explained.

The resistive is a common type of touch screen technology. It is a low-cost solution found in many touch screen applications, including hand-held computers, PDA's, consumer electronics, and point-of-sale-applications. The resistive touch screens are such that a pair of resistive layers facing with each other is provided on a touch screen element. The pressed position is detected by contact between the resistive layers so that one of the resistive layers is formed on a flexible film for deformation during pressing. As mentioned above, the resistive film type is widely used, but disadvantageous due to degraded mechanical and environmental reliability. At the same time, although the resistive touch screen today are widely used on consuming electronic products, it is unable to identify multiple contact points simultaneously on its display area.

The ultrasonic wave touch screen first converts an electric signal into an ultrasonic wave through a transducer, and then directly transmits the ultrasonic wave through a surface of the touch panel. When the touch panel is used, the ultrasonic wave may be absorbed by contacting a pointer to cause attenuation, and an accurate position of the contact is obtained through comparison and calculation between attenuation amounts before and after use. The surface acoustic wave touch screen is disadvantageous due to generation of noise and/or susceptibility to noise.

The electromagnetic type touch screen is such that, in the field of magnetism, a magnetic field is normally generated by a coil due to electromagnetism and said magnetic field induces a voltage in another coil, also called receiver coil, under the premise that the magnetic field strength changes in the receiver coil. It is clear that a non-moving receiver coil is not capable to measure a non-altering magnetic field since no voltage is induced by said magnetic field. There are already means, which can measure a position and/or orientation of a receiver means in relation to a specific magnetic field generating means. To measure the orientation in a 3-dimensional space normally three orthogonal arranged probes are used to calculate the coordinates. These arrangements are most of the time very bulky, space taking and needs a special stylus.

The capacitance type touch screen adopts capacity changes generated from the combination of static electricity between arranged transparent electrodes and a human body, so as to detect coordinates of the contact position through a generated induced current. That is, the capacitance type touch screen includes one substrate having an electrode formed thereon. In the capacitance type touch panel, when, for example, a finger contacts and approaches the touch panel, a variation in capacitance between the electrode and the finger is detected, thereby detecting input coordinates. Since the capacitance type touch panel is a non-contact type, it has high durability, excellent environmental and mechanical reliability due to changeable upper barrier layer unlike the resistive film type touch panel. However, the capacitance type touch panel has disadvantages in that it is difficult to input information with fingers or a pen. The capacitance type touch screen may be divided to two types, that is, an analogue type and a digital type.

The optical type touch screens principally use no films for touch recognition such that transmittance is 100%. Furthermore, no reflexibility, degradation of brightness and blurring of displays are generated from these optical touch screens. Maintenance of transmittance and brightness in displays is an important factor for image clarity, such that an optical type is adequate for implementation of high quality screens. Furthermore, the optical type touch screens utilize the principle of light source reception and blocking, such that no load is applied to a sensor as detection is not performed by physical or electrical contacts, which increases reliability for use in factory monitoring, various automation equipment and Automatic Telling Machines. The optical type touch screens are advantageously in that these screens are free from such materials as films or ITO (Indium Tin Oxide) protective films to thereby have less susceptibility to scratches or external shocks and a lower error probability including erroneous operation.

DISCLOSURE

Technical problem

The present invention is directed to provide an input device having a single electrode layer that is capable of accurately sensing an inputted position and reducing the number of lead electrodes transmitting an inputted signal.

Technical problems to be solved by the present invention are not restricted to the above-mentioned, and any other technical problems not mentioned so far will be clearly appreciated from the following description by skilled in the art.

Technical Solution

An object of the invention is to solve at least one or more of the above problems and/or disadvantages of an input device in whole or in part and to provide at least the advantages described hereinafter. In order to achieve at least the above objects, in whole or in part, and in accordance with the purposes of the invention, as embodied and broadly described, and in one general aspect of the present invention, there is provided an input device, the device characterized by: a first main electrode extended to a first direction; a plurality of first diverging electrodes, each extended from the first main electrode to a second direction, and having a different area based on position; a second main electrode extended to the first direction and arranged in parallel with the first main electrode; and a plurality of second diverging electrodes, each extended from the second main electrode, and disposed among the first diverging electrodes, wherein each of the first diverging electrodes gradually increases or decreases an area as advancing to the first direction.

In another general aspect of the present invention, there is provided an input device, the device characterized by: a first main electrode extended to a first direction; a first diverging electrode extended from the first main electrode to a second direction; and a third diverging electrode extended from the first main electrode, arranged at a side of the first diverging electrode, and having an area wider than that of the first diverging electrode.

Preferably, the input device further includes a fifth diverging electrode extended from the first main electrode, arranged at a side of the third diverging electrode, and having an area wider than that of the third diverging electrode.

Preferably, the input device further includes a second main electrode arranged in parallel with the first main electrode, a second diverging electrode extended from the second main electrode and arranged between the first diverging electrode and the third diverging electrode, and a fourth diverging electrode extended from the second main electrode, arranged between the third diverging electrode and the fifth diverging electrode, and having an area smaller than that of the second diverging electrode.

Preferably, a sum of areas of the first and second diverging electrodes corresponds to that of the third and fourth diverging electrodes.

Preferably, the input device further includes a first lead electrode electrically connected to the first main electrode, and a second lead electrode electrically connected to the second main electrode.

Preferably, a width of the third diverging electrode is greater than that of the first diverging electrode.

Advantageous Effects

An area of each of the first diverging electrodes in the input device according to the present invention becomes different based on its position, and particularly, the area of each of the first diverging electrodes comes to increase or decrease to a first direction, where a size of a signal in response to a capacitance sensed by the first diverging electrodes and second diverging electrodes differs based on each area of the first and second diverging electrodes that overlap a finger. That is, ratios of sizes of signals in response to capacitances sensed by the first diverging electrodes and second diverging electrodes are measured to calculate a position contacted by a finger, whereby a size of a signal in response to the capacitance inputted from a first main electrode gradually increases or decreases, as the position of the finger moves to the first direction, and alternatively, a size of a signal in response to the capacitance inputted from a second main electrode gradually increases or decreases, as the position of the finger moves to the first direction.

Therefore, the input device according to the present invention has another advantageous effect in that adjustment of pitches of the first and second diverging electrodes can adjust accuracy that detects the position to the first direction, and adjustment of pitch can accurately sense an inputted position.

Furthermore, the first and second main electrodes are mutually electrically connected to transmit a signal through a lead electrode, that is, a signal is transmitted through the same lead electrode to a position of the first direction (e.g., position to a direction of an x axis) and to a position of the second direction (e.g., position to a direction of a y axis), whereby a smaller number of lead electrodes can sense an inputted position, and all the electrodes that sense the position may be formed on a single layer, that is, the first main electrode, the first diverging electrodes, the second main electrode and the second diverging electrodes may be formed on the same layer.

Therefore, the input device according to the present invention has another advantageous effect in that an error can be reduced that is generated by forming electrodes like the first main electrode, the first diverging electrodes, the second main electrode and the second diverging electrodes that sense positions on mutually different layers, whereby an inputted position can be accurately sensed.

DESCRIPTION OF DRAWINGS

The teachings of the present invention can be readily understood by considering the following detailed description in conjunction with the accompanying drawings, in which.

BEST MODE

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
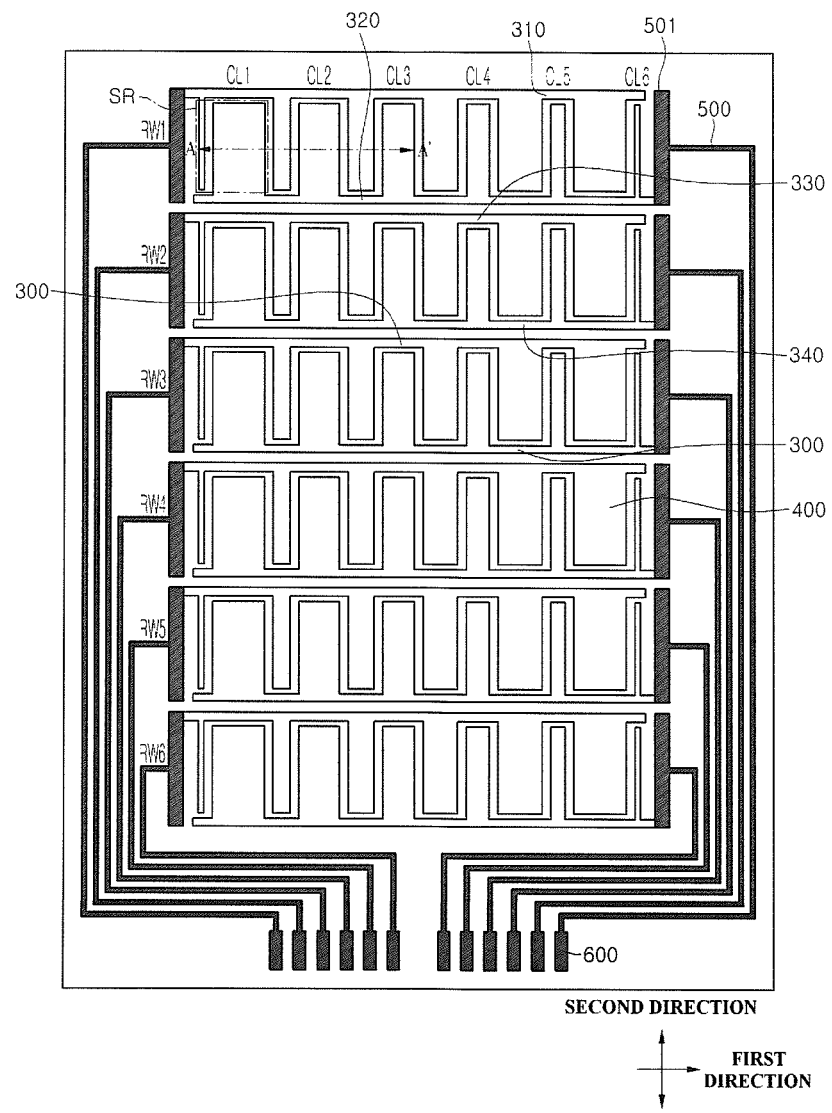
FIG. 1 is a plan view illustrating an electrode structure of a capacitance type touch panel according to an exemplary embodiment of the present invention.
Figure 2:
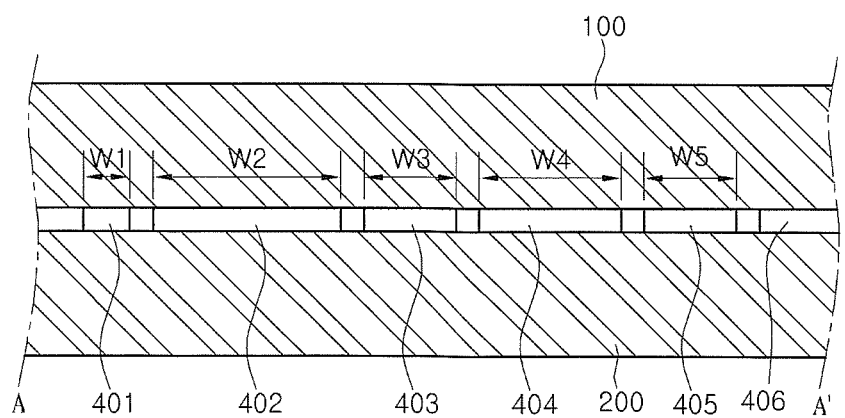
FIG. 2 is a cross-sectional view along line A-A' of FIG. 1.
Figure 3:
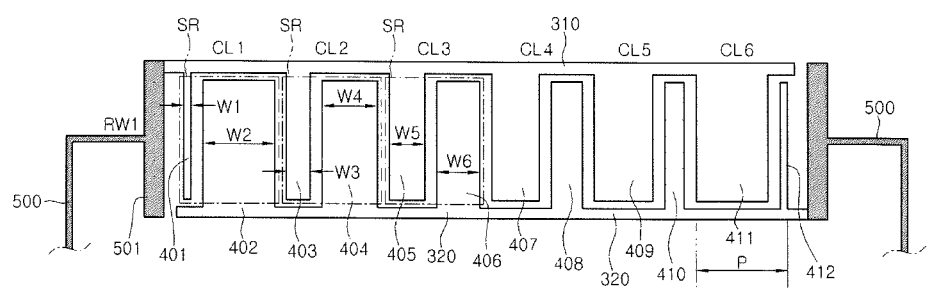
FIG. 3 is a plan view illustrating a first row of capacitance type touch panel according to an exemplary embodiment of the present invention.

The disclosed embodiments and advantages thereof are best understood by referring to FIGS. 1-3 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," etc.," are not intended to limit the order of the processes. These words are simply used to guide the reader through the description of the methods. It will be understood that when an element such as a layer or region is referred to as being "on" or "under" another element, it can be directly on or extend directly onto the other element or intervening elements may also be present.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

FIG. 1 is a plan view illustrating an electrode structure of a capacitance type touch panel according to an exemplary embodiment of the present invention, FIG. 2 is a cross-sectional view along line A-A' of FIG. 1, and FIG. 3 is a plan view illustrating a first row of capacitance type touch panel according to an exemplary embodiment of the present invention.

Referring to FIGS. 1, 2 and 3, a capacitance type touch panel according to an exemplary embodiment of the present invention includes an upper substrate (100), a bottom substrate (200), a plurality of main electrodes (300), a plurality of diverging electrodes (400), a plurality of lead electrodes (500) and a plurality of pad electrodes (600).

The upper substrate (100) is opposite to the bottom substrate (200). The upper and bottom substrates (100, 200) are transparent, and are formed with insulation materials. Examples of insulation materials include glass or transparent plastic. To be more specific, examples of insulation materials include polymethylmethacrylate and polyethyleneterephthalate, PET).

The upper substrate (100) may be flexible, while the bottom substrate (200) may be rigid. Alternatively, all the upper and bottom substrates (100, 200) may be rigid. The upper substrate (100) may be attached to the bottom substrate (200) through an adhesive layer. That is, an adhesive layer may be interposed between the upper and bottom substrates (100, 200). Furthermore, an adhesive layer may be interposed between the upper substrate (100) and the main electrodes (300), and an adhesive layer may be interposed between the upper substrate (100) and the diverging electrodes (400).

Each of the main electrodes (300) is arranged side by side. The main electrodes (300) are extended to a first direction. Each of the main electrodes (300) may be arranged in parallel. The main electrodes (300) are arranged on the bottom substrates (200). To be more specific, the main electrodes (300) are arranged between the upper and bottom substrates (100, 200).

The capacitance type touch panel according to the exemplary embodiment of the present invention is formed with the main electrodes (300) defined by a plurality of rows (RW1, RW2, RW3, RW4, RW5, RW6). That is, two main electrodes (300) form a row.

For example, a first main electrode (310) and a second main electrode (320) form a first row (RW1), and a third main electrode (330) and a fourth main electrode (340) form a second row (RW1). Although FIG. 1 defines the plurality of rows (RW1, RW2, RW3, RW4, RW5, RW6), the present exemplary embodiment of the present invention is not limited thereto, and more number of main electrodes and more number of rows may be formed or defined by size of the touch panel and sensing accuracy of the touch panel.

Each of the diverging electrodes (400) is diverged from each of the main electrodes (300). Each of the diverging electrodes (400) is extended to a second direction from each of the main electrodes (300). For example, the second direction may be perpendicular to the first direction. That is, the first direction may be an x axis, while the second direction may be a y axis.

Each of the diverging electrodes (400) may have a different area based on the position of the first direction. To be more specific, as the diverging electrodes (400) advance to the first direction, the diverging electrodes (400) may gradually have a large area, or may gradually have a smaller area. That is, as the diverging electrodes (400) advance to the first direction, diverging electrodes, each with a larger area are arranged.

For example, the diverging electrodes (400) diverged from the first main electrode (310) gradually have a larger area as advancing to the first direction. In the same context, the diverging electrodes (400) diverged from the second main electrode (320) gradually have a smaller area as advancing to the first direction.

Each of diverging electrodes (400), when viewed in a top plan view, may take the shape of a rectangle. Furthermore, each of the diverging electrodes (400) has a different width based on position of the first direction. To be more specific, each of the diverging electrodes (400) may gradually have a wider or narrower width as advancing to the first direction. For example, each of the diverging electrodes (400) diverged from the first main electrode (310) gradually has a wider width as advancing to the first direction, while each of the diverging electrodes (400) diverged from the second main electrode (320) gradually has a narrower width as advancing to the first direction.

Referring to FIGS. 2 and 3, and to be more specific, a first diverging electrode (401), a third diverging electrode (403), a fifth diverging electrode (405), a seventh diverging electrode (407), a ninth diverging electrode (409), and an eleventh diverging electrode (411) are extended from the first main electrode (310) to the second direction.

The first diverging electrode (401) has the smallest area, compared with that of the third, fifth, seventh, ninth and eleventh diverging electrodes (403, 405, 407, 409, 411). Furthermore, the first diverging electrode (401) has a narrowest width (W1), compared with that of the third, fifth, seventh, ninth and eleventh diverging electrodes (403, 405, 407, 409, 411).

The third diverging electrode (403) is arranged beside the first diverging electrode (401) and has a larger area than that of the first diverging electrode (401). Furthermore, the third diverging electrode (403) has a wider width (W3) than that of (W1) of the first diverging electrode (401). The fifth diverging electrode (405) is arranged beside the third diverging electrode (403) and has a larger area than that of the third diverging electrode (403). Furthermore, the fifth diverging electrode (405) has a wider width (W5) than that (W3) of the third diverging electrode (403). Likewise, each area and each width of the seventh diverging electrode (407), the ninth diverging electrode (409) and the eleventh diverging electrode (411) are gradually enlarged and gradually widened in that order.

The second diverging electrode (402), the fourth diverging electrode (404), a sixth diverging electrode (406), the eighth diverging electrode (408), the tenth diverging electrode (410), and twelfth diverging electrode (412) are extended from the second main electrode (320) to the second direction.

The second diverging electrode (402) is interposed between the first diverging electrode (401) and the third diverging electrode (403), and the fourth diverging electrode (404) is interposed between the third diverging electrode (403) and the fifth diverging electrode (405). Likewise, each of the sixth, eighth and tenth diverging electrodes (406, 408, 410) is arranged among the fifth, seventh, ninth and eleventh diverging electrodes (405, 407, 409, 411). Furthermore, the twelfth diverging electrode (412) is arranged beside the eleventh diverging electrode (411).

The second diverging electrode (402) has the largest area and the widest width, compared with those of fourth, sixth, eighth, tenth and twelfth diverging electrodes (404, 406, 408, 410, 412). The fourth diverging electrode (404) has a smaller area than that of the second diverging electrode (402). The fourth diverging electrode (404) has a narrower width (W4) than that (W2) of the second diverging electrode (402). Likewise, each area and each width of the sixth diverging electrode (406), the eighth diverging electrode (408), the tenth diverging electrode (410) and the twelfth diverging electrode (412) are gradually decreased and gradually narrowed in that order.

The first to twelfth diverging electrodes (401☐412) may have a symmetrical structure. That is, the area of the first diverging electrode (401) may be identical to that of the twelfth diverging electrode (412), and the area of the second diverging electrode (402) may be identical to that of the eleventh diverging electrode (411). Likewise, each area of the third and tenth electrodes (403, 410) may be identical, each area of the fourth and ninth diverging electrodes (404, 409) may be identical, each area of the fifth and eighth diverging electrodes (405, 408) may be identical, and each area of the sixth and seventh diverging electrodes (406, 407) may be identical.

Likewise, each width of the first and twelfth electrodes (401, 412) may be identical, each width of the second and eleventh electrodes (402, 411) may be identical, each width of the third and tenth electrodes (403, 410) may be identical, each width of the fourth and ninth electrodes (404, 409) may be identical, each width of the fifth and eighth electrodes (405, 408) may be identical, and each width of the sixth and seventh electrodes (406, 407) may be identical.

A plurality of sensing areas (SRs) is defined by the diverging electrodes (400). The SRs are defined by adjacent two diverging electrodes. To be more specific, the SRs are mutually in the neighborhood, and defined by diverging electrodes diverging from mutually different main electrodes.

For example, the SRs may be defined by the first and second diverging electrodes (401, 402), the third and fourth diverging electrodes (403, 404) and the fifth and sixth diverging electrodes (405, 406). A sum total of areas of diverging electrodes (400) arranged on each of the SRs may be identical. That is, a sum total of areas of the first and second diverging electrodes (401, 402) may correspond to a sum total of areas of the third and fourth diverging electrodes (403, 404). Furthermore, a sum total of areas of the third and fourth diverging electrodes (403, 404) may substantially correspond to a sum total of areas of the fifth and sixth diverging electrodes (405, 406).

Likewise, a sum total of width of mutually adjacent diverging electrodes (400) is constant. For example, a sum total of width of the first and second diverging electrodes (401, 402) corresponds to a sum total of width of the third and fourth diverging electrodes (403, 404). At this time, a sum total of mutually adjacent diverging electrodes (400) is defined as a pitch (P). The pitch (P) may be substantially same as the width of each SR. Each of the diverging electrodes (400) may have a predetermined pitch (P).

At this time, the pitch (P) may be approximately in the range of 0.1 mm☐10 mm. To be more specific, the pitch (P) may be approximately in the range of 0.1 mm☐3 mm.

Columns (CL1, CL2, CL3, CL4, CL5, and CL6) may be defined by the SRs. The SRs may be arranged to the second direction in a row, whereby the columns (CL1, CL2, CL3, CL4, CL5, and CL6) are defined. For example, the columns (CL1, CL2, CL3, CL4, CL5, and CL6) may be defined by two rows of mutually adjacent diverging electrodes (400).

Therefore, the SRs are arranged to the first direction in a row, and are also arranged to the second direction in a row. Furthermore, the SRs may be arranged in rows and columns.

The main electrodes (300) and the diverging electrodes (400) may be integrally formed. Furthermore, the main electrodes (300) and the diverging electrodes (400) are transparent. The main electrodes (300) and the diverging electrodes (400) may be formed on the bottom substrate (200) by way of deposition of transparent conductive materials and patterning process. Materials of the main electrodes (300) and the diverging electrodes (400) may be ITO (Indium Tin Oxide) or IZO (Indium Zinc Oxide).

The lead electrodes (500) are electrically connected to the main electrodes (300). The lead electrodes (500) may be directly connected to the main electrodes (300) or indirectly connected to the main electrodes (300) via connection electrodes (501). Furthermore, the lead electrodes (500) are respectively connected to the pad electrodes (600). That is, the lead electrodes (500) connect the pad electrodes (600) and the main electrodes (300) respectively.

The pad electrodes (600) are bonded to an FPCB (Flexible Printed Circuit Board) by an ACF (Anisotropic Conductive Film). The FPCB (Flexible Printed Circuit Board) connects the touch panel according to the exemplary embodiment of the present invention to a driving unit such as a system or a driver IC.

Examples of materials used for the lead electrodes (500), the connection electrodes (501) and the pad electrodes (600) include molybdenum, aluminum, copper, titanium, silver and an alloy thereof. The lead electrodes (500), the connection electrodes (501) and the pad electrodes (600) may be integrally formed.

MODE FOR INVENTION

The capacitance type touch panel according to the exemplary embodiment of the present invention may receive a touch signal in the following manner.

A conductive material such a finger of a user contacts or comes in close proximate to the upper substrate (100). At this time, a capacitance is formed between the finger and part of the diverging electrodes (400). For example, a capacitance is formed between the diverging electrodes (400) arranged on the SRs corresponding to the finger and the finger.

The driving unit may measure the capacitance using the lead electrodes (500), the main electrode (300) and the pad electrodes (600). For example, the driving unit may apply a digital signal, a pulse signal or an AC (Alternating Current) voltage to the diverging electrodes (400) through the lead electrodes (500), the main electrode (300) and the pad electrodes (600) to measure a capacitance of a finger.

At this time, the driving unit may measure a position of the finger based on the position of the main electrode sensed with the capacitance. That is, the driving unit detects a position of the main electrode sensed with the capacitance to measure a coordinate of y axis of the finger. In other words, the driving unit may detect from which number of rows in the main electrode the capacitance has been sensed to measure the coordinate of y axis of the finger.

Furthermore, the capacitance may vary based on an area overlapped by the finger and the diverging electrodes (400). That is, the capacitance may increase, as the area overlapped by the finger and the diverging electrodes (400) increases. Thus, the driving unit may calculate a ratio of capacitances sensed by each main electrode arranged on the same row to measure a coordinate of an x axis of the finger. For example, if the finger is arranged on the first row (RW1), the x axis of the finger may be calculated by the ratio of capacitances sensed by the first and second main electrodes (310, 320).

To be more specific, the capacitance measured by the first main electrode (310) increases, as the position of the finger is moved from the first row (RW1) to the first direction, and capacitance measured by the second main electrode (320) decreases.

To be further more specific, based on a sensed area of which row and which column the finger is positioned, measurement values of capacitance from which number of main electrodes is measured are different, and the ratio of measured capacitances is also differentiated.

In other words, the driving unit may calculate the positions of sensed positions positioned by the finger by the ratio between positions of main electrodes from which the capacitance is measured and measured capacitances. The capacitance type touch panel according to the exemplary embodiment of the present invention may simultaneously sense the x and y axes of the finger by the main electrodes and the diverging electrodes formed on the same layer. Thus, the capacitance type touch panel according to the exemplary embodiment of the present invention can reduce an error caused by a height difference of electrodes by comparing a structure of touch panel arranged with electrodes in two or more layers.

Furthermore, the capacitance type touch panel according to the exemplary embodiment of the present invention can adjust the pitch (P) to adjust the accuracy. The capacitance type touch panel according to the exemplary embodiment of the present invention can detect a touch of a small object with a high accuracy. Still furthermore, even if a gap between the main electrodes arranged on the same row increases, the pitch (P) is made to be smaller to sense the coordinate of y axis accurately. Therefore, the capacitance type touch panel according to the exemplary embodiment of the present invention can increase the width of row to decrease the number of lead electrodes (500), whereby the capacitance type touch panel according to the exemplary embodiment of the present invention can be simply constructed.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The present invention has an industrial applicability in that pitches of the first and second diverging electrodes can be adjusted to adjust an accuracy detecting the position to the first direction, and can provide a touch screen capable of accurately sensing the inputted position.

The invention claimed is:
1. An input device, the device comprising:
a first main electrode extended to a first direction;
a plurality of first diverging electrodes, each extended from the first main electrode to a second direction, having a different area based on position, and gradually increasing in width as advancing in the first direction;
a second main electrode extended to the first direction and arranged in parallel with the first main electrode;
a plurality of second diverging electrodes, each extended from the second main electrode to the first main electrode, disposed alternately with the first diverging electrodes, and gradually decreasing in width as advancing in the first direction;
a first lead electrode electrically connected to the first main electrode;
a second lead electrode electrically connected to the second main electrode;
a first connection electrode arranged in the second direction and configured to connect the first main electrode and the first lead electrode; and
a second connection electrode arranged in the second direction and configured to connect the second main electrode and the second lead electrode;
wherein the first main electrode, the first diverging electrodes, the second main electrode, and the second diverging electrodes are directly on and in physical contact with the same planar surface, and
wherein an x position and a y position are determined by signals output from the first diverging electrodes and the second diverging electrodes.
2. The input device of claim 1, further comprising:
a driving unit configured to receive a first capacitance measured from the first main electrode and the first diverging electrodes, and a second capacitance measured from the second main electrode and the second diverging electrodes.
3. The input device of claim 1, wherein a sum of the plurality of first diverging electrodes corresponds to that of the plurality of second diverging electrodes.
4. The input device of claim 1, further comprising:
a first row; and
a second row separated from the first row and placed alongside and adjacent to the first row,
wherein the first row comprises:
the first main electrode;
the plurality of first diverging electrodes;
the second main electrode;
the plurality of second diverging electrodes;
the first lead electrode;
the second lead electrode;
the first connection electrode; and
the second connection electrode.
5. The input device of claim 4, wherein the first connection electrode and the second connection electrode are arranged on opposite sides of the first row.

6. The input device of claim 1, wherein the first lead electrode, the second lead electrode, the first connection electrode, and the second connection electrode are integrally formed.

* * * * *